United States Patent [19]

Shindo et al.

[11] Patent Number: 4,722,247
[45] Date of Patent: * Feb. 2, 1988

[54] SHIFT CONTROL SYSTEM OF AUTOMATIC TRANSMISSION

[75] Inventors: Yoshio Shindo; Kunihiro Iwatsuki; Yasushi Ando, all of Toyota, Japan

[73] Assignee: Toyota Jidosha Kabushiki Kaisha, Toyota, Japan

[*] Notice: The portion of the term of this patent subsequent to Jun. 23, 2004 has been disclaimed.

[21] Appl. No.: 784,551

[22] Filed: Oct. 4, 1985

[30] Foreign Application Priority Data

Oct. 19, 1984 [JP] Japan ................................ 59-219452
Oct. 19, 1984 [JP] Japan ................................ 59-219454

[51] Int. Cl.⁴ ........................ B60K 41/18; B60K 41/16
[52] U.S. Cl. .................................... 74/866; 74/867; 74/740; 74/752 C
[58] Field of Search ................. 74/865, 866, 867, 868, 74/740, 731, 752 C, 745, 336 R, 337, 360, 359; 474/18, 28

[56] References Cited

U.S. PATENT DOCUMENTS

| | | | |
|---|---|---|---|
| 2,923,175 | 2/1960 | Perkins | 74/740 |
| 3,864,991 | 2/1975 | Nembach | 74/868 |
| 3,944,035 | 3/1976 | McRay | 74/745 |
| 4,021,712 | 5/1977 | Ishihara et al. | 74/859 X |
| 4,060,005 | 11/1977 | Bost | 74/745 |
| 4,082,013 | 4/1978 | Dornfeld et al. | 74/859 X |
| 4,155,277 | 5/1979 | Minami et al. | 74/866 |
| 4,282,775 | 8/1981 | Van Dest | 74/360 |
| 4,367,528 | 1/1983 | Kawamoto et al. | 74/866 |
| 4,462,273 | 7/1984 | Yoshii et al. | 74/745 |
| 4,498,356 | 2/1985 | Vater et al. | 74/360 |

FOREIGN PATENT DOCUMENTS

| | | | |
|---|---|---|---|
| 0117342 | 9/1984 | European Pat. Off. | 74/745 |
| 0149448 | 9/1983 | Japan | 74/359 |
| 2030243 | 4/1980 | United Kingdom | 74/866 |

Primary Examiner—Dirk Wright
Attorney, Agent, or Firm—Oblon, Fisher, Spivak, McClelland, & Maier

[57] ABSTRACT

In a shift control system of an automatic transmission, wherein the shift control system includes a first and a second transmissions capable of automatically switching speeds separately of one another, and the first and the second transmissions are shifted simultaneously or alternately, to thereby achieve multi-speed shifts, there is provided a system for starting and completing changes in rpm for the shift of rotary members of the second transmission during the operation of changes in rpm for the shift of rotary members of the first transmission, particularly when the first transmission is high gear shifted and the second transmission is shifted simultaneously, whereby the automatic transmission as a whole is up shifted, so that the shift characteristics can be maintained satisfactorily. In this case, an acting force of a frictionally engaging device during the operation of shift of the transmission is maintained at a predetermined value for a predetermined period of time so as to prevent a neutral portion on the intermediate portion of a series of torque transmitting system from occurring instantaneously to fluctuate an output torque.

19 Claims, 6 Drawing Figures

FIG. 2

|   | C1 | C2 | C0 | B0 | B1 | B2 | B3 | 2ND | 1ST |
|---|---|---|---|---|---|---|---|---|---|
| P.N |   |   |   |   |   |   |   |   |   |
| R |   | ○ | ○ |   |   |   | ○ | LOW | RW |
| 1 | ○ |   | ○ |   |   |   | × | LOW | 1ST SPEED |
| 2 | ○ |   |   | ○ |   |   | × | HIGH | 1ST SPEED |
| 3 | ○ |   | ○ |   | × | ○ |   | LOW | 2ND SPEED |
| 4 | ○ |   |   | ○ | × | ○ |   | HIGH | 2ND SPEED |
| 5 | ○ | ○ | ○ |   |   | ○ |   | LOW | 3RD SPEED |
| 6 | ○ | ○ |   | ○ |   | ○ |   | HIGH | 3RD SPEED |

Columns C1–B3 are grouped under B; 2ND and 1ST are grouped under A.

SHIFT CONTROL SYSTEM OF AUTOMATIC TRANSMISSION

BACKGROUND OF THE INVENTION

1. Field of the Invention

This invention relates to a shift control system of an automatic transmission, and more particularly to improvements in a shift control system of an automatic transmission, wherein the shift control system includes at least a first and a second transmissions capable of automatically switching speeds separately of one another, and the first and the second transmissions are shifted simultaneously or alternately, to thereby achieve multi-speed shifts.

2. Description of the Prior Art

Along with a rapid spread in use of the automatic transmissions for motor vehicles in recent years, there have been commonly adopted such transmissions wherein a so-called over-drive device, in which a transmission gear ratio is less than 1, is connected in series to the first transmission capable of automatically switching the shift speeds in association with a vehicle speed, a throttle opening, etc. as the second transmission.

Furthermore, there is also known such a transmission wherein, based on a function of the second transmission capable of switching from lower speed to higher speed as the above-described over-drive device, shift controls shown in FIG. 2A for example are performed, so that multi-speed shifts of 6 forward speeds can be achieved. This transmission is of such an arrangement that a shift of the second transmission is actively cooperated with a shift of the first transmission, whereby the first transmission and the second transmission are shifted simultaneously or alternately, so that multi-speed shifts can be achieved.

The above-described arrangement makes it possible that the existing automatic transmission is utilized as the basis, and changes in design are minimized for manufacturing advantage, so that multi-speed shifts can be achieved. As the result, such advantages can be offered that the fuel consumption rate is improved, the power performance is bettered, the burden of frictional materials is relieved due to making the speed shifts into multi-speed shifts, and the like.

However, in the automatic transmission wherein the first and the second transmissions are shifted simultaneously or alternately to achieve the multi-speed shifts, as shown in FIG. 2, there occurs a case where the first transmission is high gear shifted and the second transmission is low gear shifted, for example, like a shift from a second speed to a third speed and like a shift from a fourth speed to a fifth speed, to thereby up shift the automatic transmission as a whole. At this time, if only the respective shifts are controlled separately of one another, an increase in shift shock is not avoidable. Furthermore, for example, while an up shift is in operation, the shift is started from a down shift, or a down shift after an up shift is performed, thus presenting such a disadvantage that there may be experienced the shift characteristics of a strange driving feeling.

On the other hand, if the release of an acting force on the side of the second transmission is too rapidly performed, then there may be presented such a disadvantage that a neutral portion occurs briefly in an intermediate portion of a series of torque transmitting systems. If such conditions occur, then, when the second transmission is disposed on the input side of the first transmission for example, an engine revolution speed is rapidly increased commensurate to a throttle opening and rotary members of the first transmission are rapidly accelerated because of no load. However, the torque of an output shaft of the first transmission (an output shaft of the automatic transmission) is rapidly lowered and the shift shock is increased accordingly. And, when the second transmission is disposed on the output side of the first transmission, the second transmission is out of the torque transmitting systems, whereby the torque of an output shaft of the second transmission (an output shaft of the automatic transmission) is lowered similarly to the above, and the shift shock is increased as well.

As a method to cope up with the above-described disadvantages, it may be contrived that an acting force of a frictionally engaging device of the second transmission during the operation of shift is maintained on a predetermined level for a predetermined period of time. However, in this case, if the predetermined level is uniformly set, there occur possibilities that a shift is not started, or the lowering effect of the shift shock is not obtained depending on the throttle opening or the magnitude of the engine torque at that time.

SUMMARY OF THE INVENTION

The present invention has been developed to obviate the above-described disadvantages of the prior art and has its object that the provision of a shift control system of an automatic transmission, wherein a first transmission is high gear shifted and a second transmission is shifted simultaneously, whereby, when the automatic transmission as a whole is up shifted, shifts are reliably started from the up shift, the shift shock is low and the shift feeling of the down shift does not remain.

To this end, a first aspect of the present invention contemplates that, in a shift control system of an automatic transmission, wherein the shift control system includes at least a first and the a second transmissions capable of automatically switching shift speeds separately of one another, and the first and the second transmissions are shifted simultaneously or alternately, to thereby achieve multi-speed shifts, there is provided means for starting and completing changes in rpm (revolutions per minute) for the shift of rotary members of the second transmission during the operation of changes in rpm for the shift of rotary members of the first transmission, when the first transmission is high gear shifted and the second transmission is shifted simultaneously, whereby the automatic transmission as a whole is up shifted.

To the above end, a second aspect of the present invention contemplates that, in a shift control system of an automatic transmission, wherein the shift control system includes at least a first and a second transmissions capable of automatically switching shift speeds separately of one another, and the first and the second transmissions are shifted simultaneously or alternately, the thereby achieve multi-speed shifts, changes in rpm for the shift of rotary members of the second transmission are started and completed during the operation of changes in rpm for the shift of rotary members of the first transmission, and an acting force of a frictionally engaging device during the operation of the shift of the transmission is maintained at a value commensurate to at least one of an engine load and a vehicle speed for a predetermined period of time, when the first transmission is high gear shifted and the second transmission is shifted simultaneously, whereby the automatic transmission as a whole is up shifted.

A preferable specific form in the above-described arrangement is such that the start of changes in rpm for shifts of the rotary members of the first transmission is judged from a pressure switch adapted to be turned on when the hydraulic pressure of a frictionally engaging device associated with the aforesaid shifts reaches a predetermined pressure.

Or, the aforesaid start of changes in rpm for shifts of the rotary members of the first transmission if judged from whether or not a detected value reaches a predetermined value upon continuous detection of the hydraulic pressure of the frictionally engaging device associated with the aforesaid shifts.

Or, the aforesaid start is judged from a lapse of time measured by a timer referenced from a time of judgment of the aforesaid shift.

Or, the aforesaid start is judged from a lapse of time measured by a timer referenced from a time of command of the aforesaid shift.

Or, the aforesaid start is judged from a lapse of time measured by a timer referenced from a time point at which hydraulic pressure of the frictionally engaging device associated with the aforesaid shift reaches a predetermined pressure.

Or, the aforesaid start is judged from the motion of a piston of an accumulator of the frictionally engaging device associated with the aforesaid shift.

Or, the aforesaid start is judged from a torque of an output shaft.

Or, the aforesaid start is judged from a change in rpm of an engine revolution speed.

Or, the aforesaid start is judged from a change in rpm of a specific rotary member in the automatic transmission.

Additionally, the better setting of the timer can be obtained when the timer is set as commensurate to at least one of an engine load and a vehicle speed. And, aforesaid the predetermined period of time is set as commensurate to at least one of engine load and vehicle speed too.

According to the first aspect of the present invention, changes in rpm of the rotary members of the second transmission for the shift are started and completed while the rotary members of the first transmission are performing the changes for the shift, whereby the shift shock is reduced and the feeling of only the up shift should necessarily be given to the driver.

According to the second aspect of the present invention, further, the acting force of the frictionally engaging device during the operation of shift of the transmission is maintained at a value commensurate to at least one of an engine load and a vehicle speed for a predetermined period of time, so that the shift can be started at a proper time, and, subsequently, the shift can be gradually made after the start of the shift without quick interrupting the torque transmission. As the result, satisfactory shift characteristics can be obtained without any rapid change in the torque of the output shaft.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a chart showing the engaged state of the respective frictionally engaging devices of the aforesaid automatic transmission;

DETAILED DESCRIPTION OF THE INVENTION

Detailed description will hereunder be given of one embodiment of the present invention with reference to the drawings.

Figure 1:
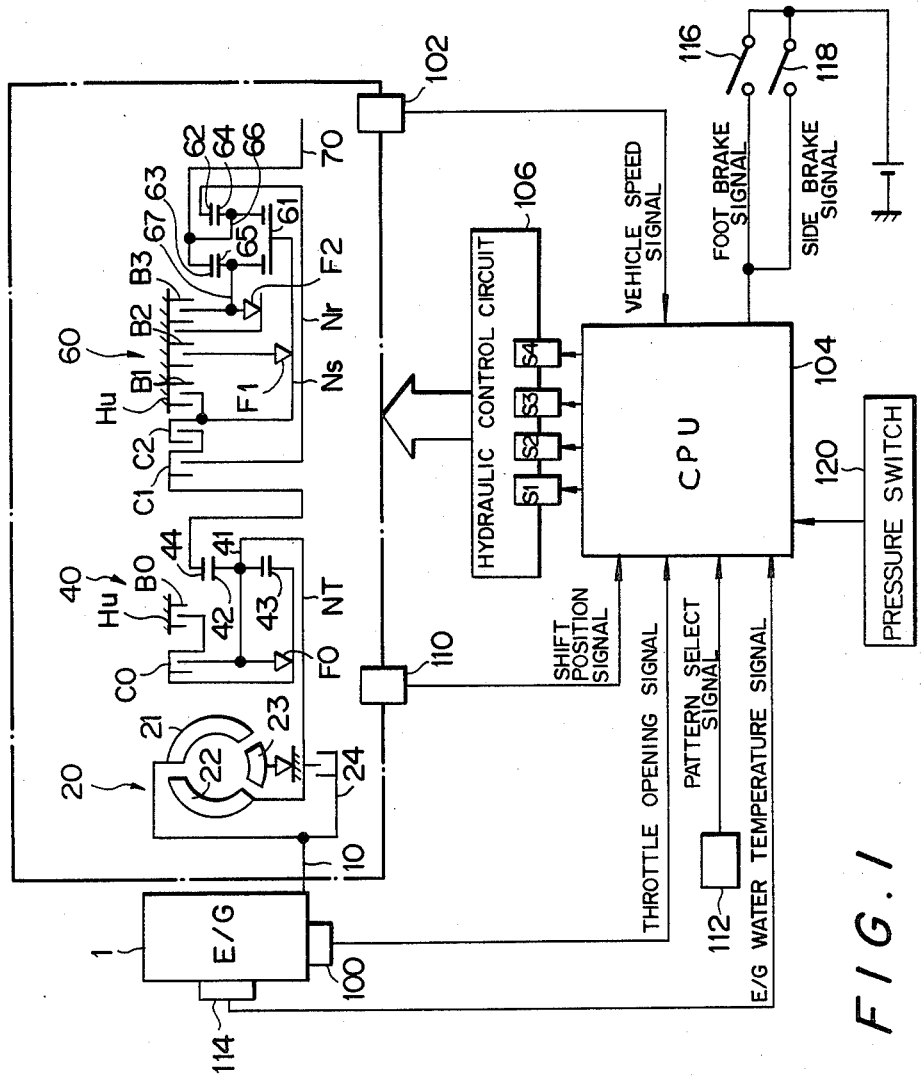
FIG. 1 is a general schematic view of the automatic transmission for a motor vehicle showing one embodiment of the shift control device of an automatic transmission according to the present invention.

FIG. 1 shows the general arrangement of the automatic transmission for a motor vehicle, to which is applied the present invention.

This automatic transmission includes a torque converter 20, a second transmission 40 and a first transmission 60 having three forward speeds and one rearward speed.

The torque converter 20 includes a pump 21, a turbine 22, a stator 23 and a lock-up clutch 24. The pump 21 is connected to a crankshaft 10 of an engine 1, and the turbine 22 is connected to a carrier 41 of a planetary gear train in the second transmission 40.

In the second transmission 40, a planetary pinion 42 rotatably supported by this carrier 41 is in mesh with a sun gear 43 and a ring gear 44. Furthermore, a clutch C0 and a one-way clutch F0 are interposed between the sun gear 43 and the carrier 41. And a brake B0 is interposed between the sun gear 43 and a housing Hu.

In the first transmission 60, there are provided two rows including one on the front side and the other on the rear side as the planetary gear train. This planetary gear train includes a sun gear 61 being commonly used, ring gears 62 and 63, planetary pinions 64 and 65 and carriers 66 and 67.

The ring gear 44 of the second transmission 40 is connected to the ring gear 62 through a clutch C1. Furthermore, a clutch C2 is interposed between the ring gear 44 and the sun gear 61. Further, the carrier 66 is connected to the ring gear 63, and the carrier 66 and the ring gear 63 are connected to an output shaft 70.

On the other hand, a brake B3 and a one-way clutch F2 are interposed between the carrier 67 and the housing Hu. Further, a brake B2 is provided between the sun gear 61 and the housing Hu through a one-way clutch F1. Furthermore, a brake B1 is interposed between the sun gear 61 and the housing Hu.

This automatic transmission has the above-described transmission section, and solenoid valves S1-S4 in a hydraulic control circuit 106 are driven and controlled in accordance with a shift pattern preset by a control processing unit (CPU) 104 to which are inputted signals from a throttle sensor 100 for detecting a throttle opening representing a load condition of the engine 1, a vehicle speed sensor 102 for detecting a vehicle speed and a like. As the result, combinations of engagements between the clutches, brakes and the like as shown in the B portion in FIG. 2 are performed for shift control.

Additionally, in FIG. 2, indicated by marks "o" are engagements and marks "x" engagements only when an engine brake is used.

The solenoid valves S1 and S2 perform controls of shift of the first transmission 60, the solenoid valve S3 performs controls on the higher speed side and the lower speed side of the second transmission 40 and the solenoid S4 performs control of the lockup clutch 24 of the torque converter 20, respectively.

Additionally, in FIG. 1, designated at 110 is a shift position sensor for detecting positions of N (Neutral), D (Drive) and R (Reverse), which are operated by the driver, 112 a pattern select switch for detecting position of E (Economical running), P (Power running) and the like, 114 a water temperature sensor for detecting a cooling water temperature of the engine, 116 a brake switch for detecting operations of a foot brake and 118 another brake switch for detecting operations of a side brake, respectively.

Here, in this embodiment in addition to the above-described input signals, the CPU 104 has inputted thereto a signal from a pressure switch 120 for detecting a hydraulic pressure in an oil line directed to the brake B2 in order to confirm the start of a change in rpm of the rotary members in the first transmission 60 due to a shift command.

Figure 3:
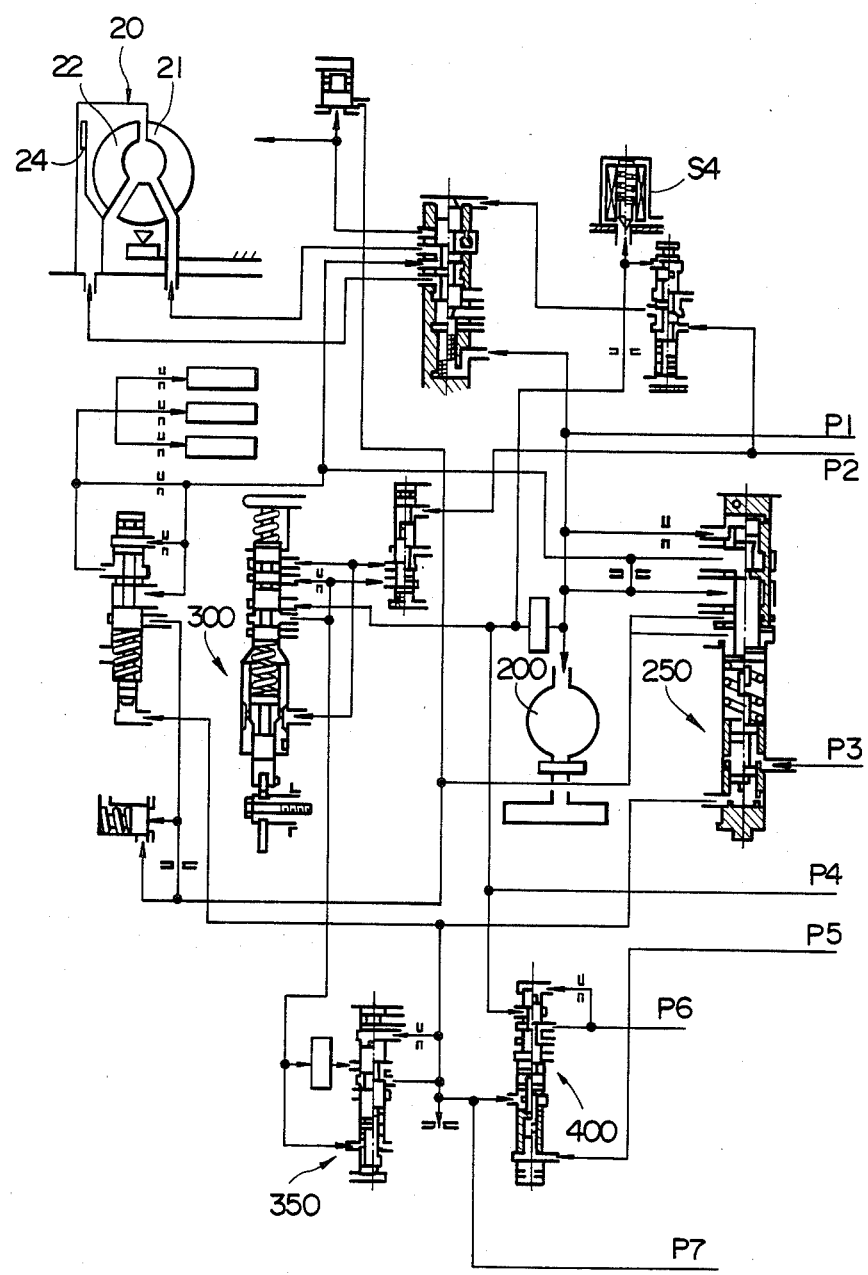
FIGS. 3(a) and 3(b) are diagrams of hydraulic control circuits.
Figure 3B:
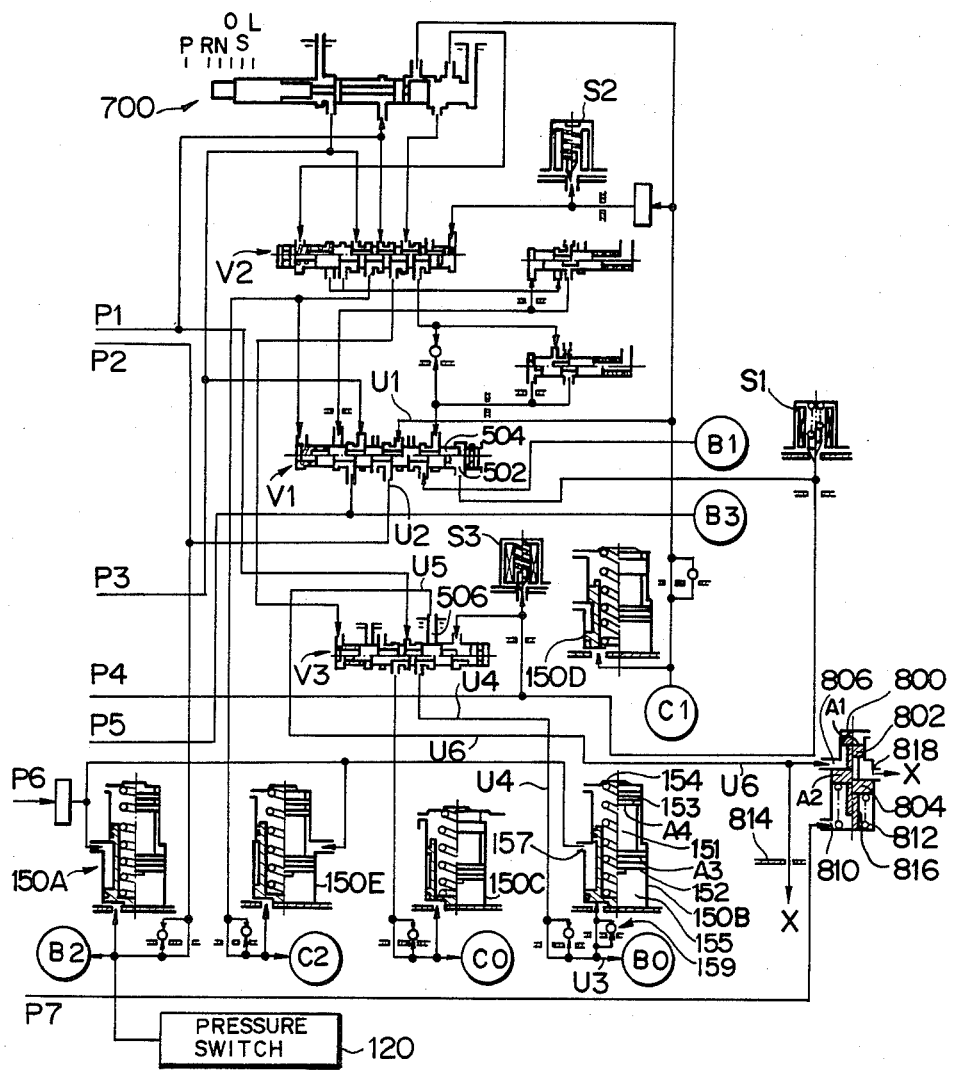

FIGS. 3(a) and 3(b) show one and the same hydraulic circuit divided into two, and P1–P7 in the drawings show the points indentical with each other.

In the drawings, denoted at V1 is a first shift valve for switching between a first speed condition and a second speed condition of the first transmission 60, S1 a solenoid valve for controlling the switching of the first shift valve V1, V2 a second shift valve for switching between the second speed condition and a third speed condition of the first transmission, S2 a solenoid valve for controlling the switching of the second shift valve V2, V3 a third shift valve for switching between the higher speed side and the lower speed side of the second transmission 40, and S3 the solenoid valve for controlling the switching of the third shift valve V3, respectively.

Furthermore, indicated at 800 is a release control valve for controlling drain of hydraulic pressure from the third shift valve V3 to control a time duration and a working pressure when an acting force of the brake B0 is released.

This release control valve 800 has two lands 802 and 804, which have face areas A1 and A2 different from each other (A1<A2). Drain hydraulic pressure of the brake B0 from a port 506 of the third shift valve V3 is inputted to a port 806 interposed at an intermediate position between these two lands 802 and 804, and a throttle modulator pressure (a hydraulic pressure controlled as commensurate to a throttle opening) from a throttle modulator valve 350 is inputted to a port 810 provided downwardly of the land 804 having the larger face area in the drawing. (As this hydraulic pressure, any pressure may be adopted which can be increased or decreased as commensurate to a throttle opening, and for example, a throttle pressure from a throttle valve 300. Furthermore, a line pressure may be adopted only if the diameter of valve thereof is altered).

More specifically, in this release control valve 800, when a hydraulic pressure (the drain hydraulic pressure from the brake B0) acts on the input port 806, a downwardly directed force obtained by multiplying difference between the face area (A2−A1) by the input hydraulic pressure, in balanced with a sum of an upwardly directed force of a spring 812 and an upwardly directed force obtained by multiplying a hydraulic pressure increasing or decreasing as commensurate to a throttle opening acting on the port 810 by the face area A2 so as to determine a position of a spool 816, so that a drain port 818 can be opened or closed.

On the other hand, an orifice 814 is provided on the side of the input port of the release control valve 800. The orifice 814 has a function of maintaining the hydraulic pressure of a drain system of the brake B0 at a predetermined level, and another function of slowly draining the drain oil of the brake B0 when the drain port 806 of the release control valve 800 is closed. An acting force of the brake B0 during drain is influenced by the diameter of this orifice 814, and the drain speed is influenced by two factors, i.e. the diameter of the orifice 814 and the diameter of an orifice 159 with a check valve, which is provided on an oil line between an accumulator 150B and an oil line U3.

This orifice 159 with the check valve feeds oil to the accumulator 150B at a normal rate when the brake B0 is engaged, and has a function of retarding the drain of oil from the accumulator 150B only when the brake B0 is released.

Additionally, designated at 150A, 150C to 150E are accumulators for controlling transitional characteristics of hydraulic pressure in oil lines to the brake B2, clutches C0, C1 and C2, and 700 a manually operated valve interlocked with a shift lever, operated by the driver, respectively. Denoted at 200 is an oil pump, 250 a primary regulator valve, 300 a throttle valve, and 400 an accumulator control valve, respectively. The arrangements and actions of these components are basically similar to those in the prior art, so that the detailed description need not be repeated.

Now, the pressure switch 120 is provided on an oil line to the brake B2. This pressure switch 120 is adapted to operate to output an ON signal to the CPU 104 when a hydraulic pressure PB2 in an oil line to the brake B2 reaches a predetermined pressure PB2 (which would better be set as commensurate to the throttle opening) where the rotary members of the first transmission 60 start changes in rpm.

Figure 4:
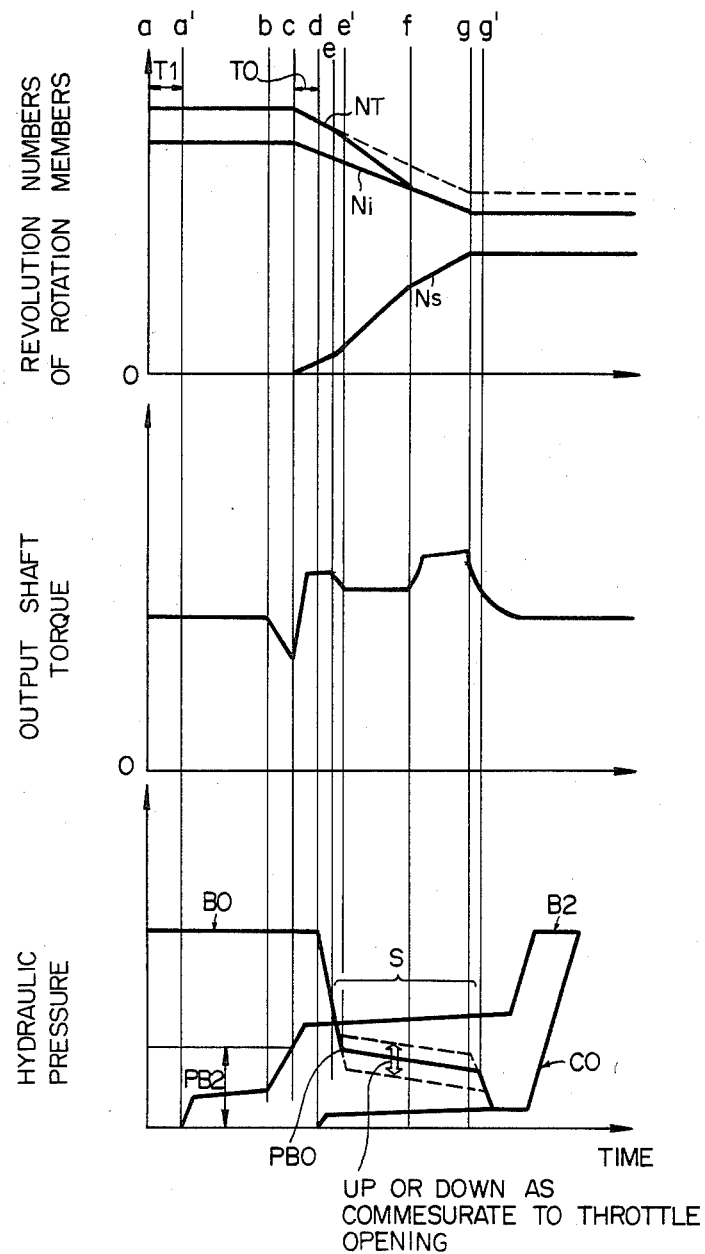
FIG. 4 is a diagram of shift transition characteristics.
Figure 5:
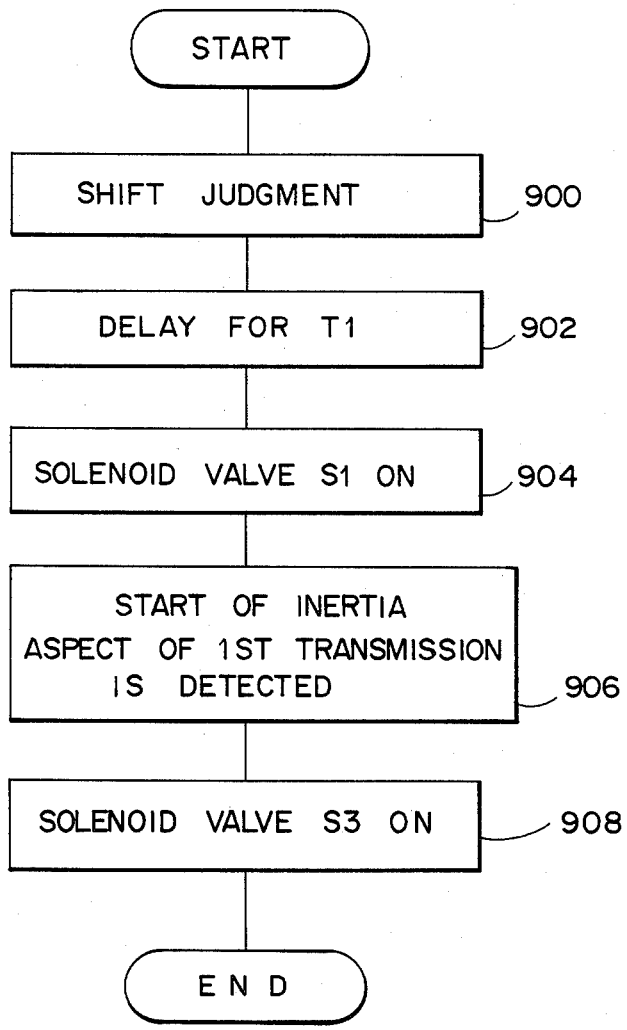
FIG. 5 is flow chart showing the steps of shift control.

Description will hereunder be given of action of this control system with reference to FIGS. 4 and 5. In the case where the first transmission 60 is high gear shifted and the second transmission 40 is shifted simultaneously, whereby, when the automatic transmission as a whole is up shifted, there are various shifts as apparent from FIG. 2. However, since the gist of the invention relating to shifts is common to all of these shifts, explanation is given of a shift from the second speed to the third speed as an example, here.

Firstly, a judgment of shift (judgment of shift from the second speed to the third speed) is made from a vehicle speed, a throttle opening or a signal of a pattern select switch, etc. at a point a in FIG. 4 through an action similar to the conventional one (Step 900 in FIG. 5). Upon making this judgment, a delay for a predetermined time duration T1 is taken (Step 902), and thereafter, at a point a′, the solenoid valve S1 is turned on to switch the first shift valve V1 for controlling the first transmission (Step 904). As the result, the line pressure of a control port 502 of the first valve V1 is drained, and a spool 504 of the first shift valve V1 moves as shown in the upper portion of the drawing. Due to this movement, an oil line U1 is connected an oil line U2, whereby hydraulic pressure is begun to be fed to the brake B2. Additionally, the reason why the delay for a time duration T1 (which would better be set as commensurate to the throttle opening) is taken is that, when two or more judgments of shift are made in a short period of time, only the last judgment should be selected.

Firstly, the engagement of the brake B2 is begun at a point b by turn-on of the solenoid valve S1, and subsequently, changes in rpm of the respective rotary members of the first transmission at a point c are started.

On the other hand, when the pressure switch 120 is actuated at the predetermined pressure PB2 as commensurate to the throttle opening due to an increase of the hydraulic pressure of the brake B2, the CPU 104 confirms the start of an inertia phase (the period of time, during which changes in rpm of the respective rotary members are performed) of the first transmission 60 (Step 906). In this embodiment, to more accurately grasp the inertia phase (in consideration of the possibility of a non-start of the inertia phase at the point PB2), the start of the aspect at a time point (point d) upon lapse of a delay of a predetermined time duration T0 as commensurate with the throttle opening after the start of operation of the pressure switch 120. In response to this grasp, a shift command is delivered to the solenoid valve S3 (Step 908). As a result, the third shift valve V3 is switched, the hydraulic pressure of the brake B0 is drained, and a low gear shift of the second transmission 40 is started.

At this time, the drain characteristics of the brake B0 adjusted by the orifice 159 with the check valve, which is attached to the accumulator 150B, the release control valve 800 and an orifice 814 provided on the side of an input port of the release control valve 800, in such a manner that the low gear shift of the second transmission 40 is completed between the point c and point f (the inertia phase of the first transmission 60) in FIG. 1 and a proper level commensurate to the throttle opening is maintained for a predetermined period of time (the output shaft torque level of the second transmission is maintained at a predetermined level for a predetermined period of time).

More specifically, when the hydraulic pressure of the drain oil of the brake B0 exceeds a pressure PB0 predetermined by the throttle pressure and a force of a spring 812, the release control valve 800 is brought into a state shown in the right in the drawing (This is because A1<A2). In consequence, the port 806 is short-circuited to the port 818, with the result that the drain oil of the brake B0 is passed through oil lines U3 and U4, the port 506 of the first shift valve V1, oil lines U5 and U6, and the ports 806 and 808 of the release control valve 800, and rapidly drained (the points d to e' in FIG. 4). When the hydraulic pressure of the brake B0 becomes lower than the predetermined pressure PB0' by this rapid drain, the state shown in the left in the drawing is brought about and the port 818 is closed by the spring 812. In consequence, hereinafter, the drain oil of the brake B0 is slowly drained through the orifice 814 (points e' to g').

Additionally, when the hydraulic pressure of this brake B0 is drained, the accumulator 150B functions in the following way. When the hydraulic pressure of the brake B0 begins to be drained, an accumulator piston 151 of the accumulator 150B is positioned at a top end portion in the drawing. When the hydraulic pressure of the brake B0 begins to be drained and the hydraulic pressure in the oil line U3 is lowered, a sum of a downwardly directed force obtained by multiplying a difference between a face area A3 of a first land 152 and a face area A4 of a second land 153 of the accumulator piston 151 by an accumulator control pressure inputted from a port 157 and a downwardly directed force by a spring 154, becomes larger than an upwardly directed force obtained by multiplying the hydraulic pressure of the oil line U3 by the face area A3 of the first land 152 of the accumulator piston 151. In consequence, the accumulator piston 151 begins to move downwardly. As result, oil in an accumulator chamber 155 is drained from the orifice 814 or the output port 818 of the release control valve 800 through the orifice 159 with the check valve, the oil line U4, the port 506 and the oil line U5 similarly to the drain of the brake B0. In this case, oil drain from the accumulator chamber 155 is retarded due to the pressure of the orifice 159 with the check valve, whereby the drain from the brake B0 is rapidly lowered to the predetermined pressure PB0' through the release control valve as described above (points d-e' in FIG. 4). Furthermore, when the pressure is lowered to the predetermined pressure PB0 or less, the port 818 is closed, whereby the rapid hydraulic pressure lowering in a drain system of the brake B0 is controlled due to the pressure of the orifice 814, so that the oil in the accumulator chamber 155 is slowly drained through a orifice 159 with the check valve. As the result, a predetermined pressure commensurate to the throttle opening (hydraulic pressure in the port 810) is maintained finally (in the region S in FIG. 4).

On the other hand, in the first transmission 60, which has begun the inertia phase from the point c, the hydraulic pressure to the brake B2 is slowly raised through the action of the accumulator 150A, the inertia phase is completed at the point g as indicated by an Ns chart (chart of the rotation of the sun gear 61) in FIG. 4.

As for the clutch C0, there is no need of engagement in synchronism with the brake B0 due to the pressure of the one-way clutch F0 (Refer to FIG. 1), whereby a stroke of a piston of the clutch C0 is made large to shift the time of engagement to a point f or thereafter, so that the shift shock can be reduced.

In consequence, due to the above-described drain characteristics of the brake B0, the second transmission 40 starts a shift after the first transmission 60 enters the inertia phase and completes a change in rpm while the first transmission 60 is still in the inertia phase as indicated by an NT chart (chart of the output shaft of a turbine 22) in FIG. 4. Additionally, an Ni chart in FIG. 4 indicates the characteristics of the ring gear of the first transmission.

As described above, in this embodiment, the hydraulic pressure of the brake B0 is drained after the detection of the start of the inertia phase of the first transmission 60, and the characteristics of drain of the brake B0 is made to be such that the hydraulic pressure is rapidly lowered to the predetermined pressure PB0, and thereafter, the hydraulic pressure is maintained at a predetermined pressure commensurate to the throttle opening for a predetermined period of time, so that the second transmission 40 starts the shift accurately in the case of every throttle openings after the first transmission starts changes in rpm. Furthermore, a gradual shift can be performed while the second transmission 40 is made to maintain a predetermined torque transmission T so that the first transmission 60 and the engine 1 are not cut off each other. In consequence, the shift shock can be made very small as shown in an output torque shaft chart in FIG. A. Additionally, FIG. A shows the case where output shaft torques of the first and second transmission are shifted separately of each other.

In the foregoing, description has been given of the arrangement and action when the shift is performed from the second speed to the third speed, however, the gist of the present invention is applicable to a shift from the fourth speed to the fifth speed or another shift wherein the first transmission is high gear shifted and the second transmission is shifted simultaneously, whereby, the automatic tranmission as a whole is up shifted.

Furthermore, in the above embodiment, "the engine load" has been represented by the throttle opening, however, the present invention need not necessarily limited to this, and the output shaft torque of the engine is detected by a torque sensor for example, whereby the output shaft torque may represent "the engine load".

Additionally, in the above embodiment, as the means for detecting the inertia phase of the first transmission 60, the pressure switch 120 adapted to be turned on when the hyraulic pressure of the brake B2 reaches the predetermined pressure has been used, the detecting means for detecting the inertia phase of the first transmission 60 according to the present invention need not necessarily be limited to this, and, for example, the hydraulic pressure of the brake B2 may be continuously detected by a hydraulic pressure sensor, or may be detected by a timer referenced from the turn-on of the solenoid valve S1 or the time at which a shift is judged (which would better be set as commensurate to the throttle opening). Furthermore, the return of the piston of the accumulator may be detected, or the detection may be made from the torque of the output shaft. Further, the changes in rpm of the respective rotary members of the automatic transmission may be detected.

Further, in the above embodiment, the acting force of the frictionally engaging device during performing the low gear shift of the second transmission has been determined as commensurate to only the throttle opening, i.e. the engine load, however, according to the present invention, a factor of the vehicle speed may be combined with the throttle opening, or a considerable effect can be attained by the determination of the acting force as commensurate to only the vehicle speed.

What is claimed is.

1. A shift control system of an automatic transmission, wherein said system comprises at least first and second transmissions capable of switching speeds separately of one another, and each having at least one hydraulic fluid pressure responsive friction means for shifting rotary members thereof, said first and said second transmissions being capable of being shifted simultaneously, to thereby achieve mutli-speed shifts, comprising:
   means for instructing said friction means of said first transmission to shift speeds such that said first transmission is high shifted, whereby changes in rpm of rotary members of said first transmission subsequently occur;
   means for judging said changes in rpm of rotary members of said first transmission; and
   means for instructing said friction means of said second transmission for starting and completing changes in rpm for the shift of rotary members of said second transmission in response to said judgement and during the operation of changes in rpm for the shift of rotary members of said first transmission, such that said first and second transmissions are shifted simultaneously and said automatic transmission as a whole is up shifted.

2. A shift control system of an automatic transmission as set forth in claim 1, wherein said means for judging comprise a pressure switch adapted to be turned on when the hydraulic pressure of a frictionally engaging device associated with said shifts reaches a predetermined pressure.

3. A shift control system of an automatic transmission as set forth in claim 1, wherein said means for judging comprise means for detecting whether or not a detected value reaches a predetermined value upon continuous detection of the hydraulic pressure of a frictionally engaging device associated with said shifts.

4. A shift control system of an automatic transmission as set forth in claim 1, wherein said means for judging comprise means for detecting a lapse of time measured by a timer referenced from a time of judgment of said shift.

5. A shift control system of an automatic transmission as set forth in claim 1, wherein said means for judging comprise means for detecting a lapse of time measured by a timer referenced from a time of command of said shift.

6. A shift control system of an automatic transmission as set forth in claim 1, wherein said means for judging comprise means for detecting a lapse of time measured by a timer referenced from a time point at which hydraulic pressure of a friction means associated with said shift reaches a predetermined pressure.

7. A shift control system of an automatic transmission as set forth in claim 1, wherein said means for judging comprise means for detecting the motion of a piston of an accumulator of a friction means associated with said shift.

8. A shift control system of an automatic transmission as set forth in claim 1, wherein said means for judging comprise means for detecting a torque of an output shaft.

9. A shift control system of an automatic transmission as set forth in claim 4, wherein said timer is set as commensurate to at least one of an engine load and a vehicle speed.

10. A shift control system of an automatic transmission as set forth in claim 5, wherein said timer is set as commensurate to at least one of an engine load and a vehicle speed.

11. A shift control system of an automatic transmission as set forth in claim 6, wherein said timer is set as commensurate to at least one of an engine load and a vehicle speed.

12. A shift control system of an automatic transmission as set forth in claim 1, wherein said means for judging comprise means for detecting a change in rpm of an engine revolution speed.

13. A shift control system of an automatic transmission as set forth in claim 1, wherein said means for judging comprise means for detecting a change in rpm of a specific rotary member in said automatic transmission.

14. The system of claim 1, wherein said means for instructing said friction means of said second transmission comprise means for initiating a reduction in fluid pressure in said at least one fluid pressure responsive friction means of said second transmission in response to said judgment.

15. The system of claim 14, wherein said means for instructing said friction means of said second transmission further comprise means for maintaining a fluid pressure in said at least one fluid pressure responsive friction means of said second transmission at a value commensurate to at least one of an engine load and a vehicle speed for a predetermined period of time.

16. A shift control system of an automatic transmission as set forth in claim 15, wherein the said predetermined period of time is set as commensurate to at least one of an engine load and a vehicle speed.

17. The system of claim 15, wherein said means for maintaining comprises means for reducing said fluid pressure at a first rate after said initiation of a reduction thereof and for reducing said fluid pressure at a second rate, lower than said first rate, when said fluid pressure reaches a value commensurate with at least one of an engine load and a vehicle speed.

18. The system of claim 17, wherein said means for maintaining comprises a pressure release control valve connecting to said at least one fluid pressure responsive friction means of said second transmission and in parallel with an orifice, and means for selectively operating said pressure release valve at a fluid pressure commensurate with at least one of an engine load and a vehicle speed.

19. The system of claim 1, wherein said at least one friction means comprise at least one brake and at least one clutch.

* * * * *